Nov. 27, 1934.    J. J. CARROLL    1,982,286
PISTON RING
Filed Oct. 2, 1933

INVENTOR.
James J. Carroll
BY
Bemis, Wadsworth Lightfoot
ATTORNEYS.

Patented Nov. 27, 1934

1,982,286

UNITED STATES PATENT OFFICE 1,982,286

PISTON RING

James Joseph Carroll, Detroit, Mich.

Application October 2, 1933, Serial No. 691,802

6 Claims. (Cl. 309—24)

This invention relates to piston rings, and more especially to laminated rings wherein a plurality of relatively thin ring members are utilized in a single groove in a piston, several arrangements of which having heretofore been suggested from time to time.

In such laminated rings, it has been known to "dish" or otherwise deform them so that they were not completely flat whereby, if a plurality of such leaves were used, a certain amount of vertical and relative flexibility might be attained. In some cases a distortion resulted in intermittent contact between the laminations of the ring at spaced circularly disposed intervals and in other forms of distortion purely marginal or edgewise contact between the laminations. The object of the present invention is to produce a much more efficient and long-wearing form of laminated ring in which more independent action of the laminations is secured and wherein rolling or rocking action between the laminations is secured with a relatively high surface contact between adjacent laminations.

A further object is to provide a laminated ring in which the center portion of the laminations is strengthened to create a more resilient spring action therein lending itself especially to the intended purposes; and a still further object is to provide laminations of such cross-section or shape that the line of contact between the laminations lies inwardly of the outer edge thereof.

Still further objects and advantages, subsidiary or incidental to the aforesaid objects, or resulting from the construction or operation of the invention as it may be carried into effect, will become apparent as the said invention is hereinafter further disclosed.

Figure 1:
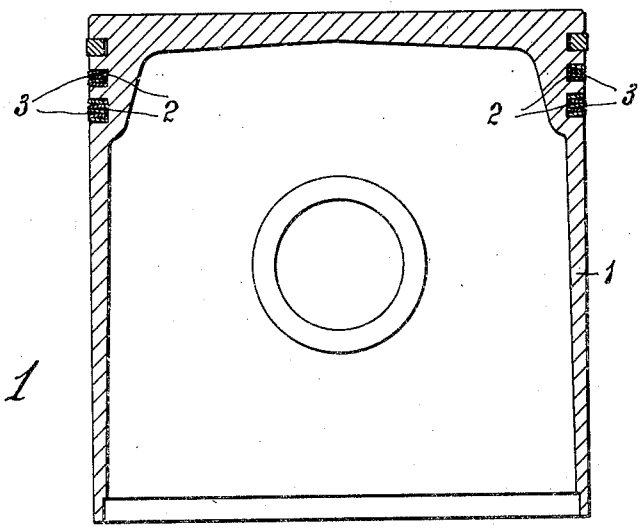
Figure 2:
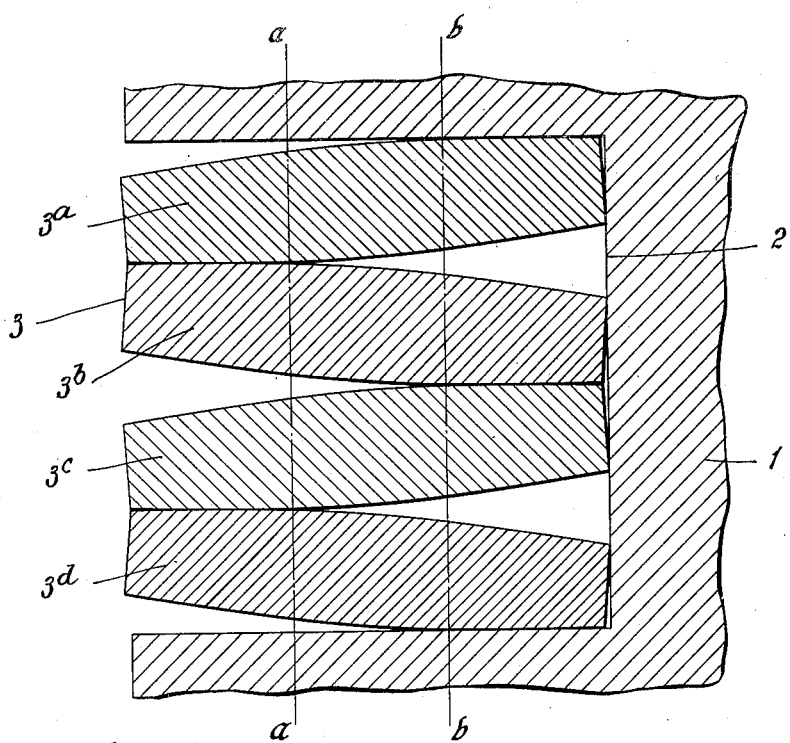

In carrying the said invention into effect, I may provide a piston ring comprising a series of laminations, adjacent laminations being "dished" in opposite directions so that adjacent laminations of a pair will converge towards their outer edges and the adjacent laminations of adjacent pairs converge towards their inner edges, each lamination tapering in cross-section from its center portion to its inner and outer edges, and the contacting margins of the laminations being arcuate in cross-section whereby actual contact is established at a point inwardly of the edge of the lamination, such contact being of a rolling nature. All of which is more particularly described and ascertained hereinafter, by way of example, having reference to the accompanying drawing, wherein:

Figure 1 is a vertical section of a piston equipped with laminated piston rings of the type referred to; and Figure 2 is a greatly enlarged fragmentary section of a piston wall illustrating the piston groove and detail of the laminated ring located therein.

Similar characters of reference indicate similar parts in both figures of the drawing.

1 indicates a piston of standard form, the upper part of which is provided with ring grooves 2, and in these grooves are shown laminated rings 3, the preferred construction of which may be clearly seen from the enlarged section, Figure 2, wherein a ring having four laminations marked respectively, $3^a$, $3^b$, $3^c$ and $3^d$ is illustrated. For descriptive purposes broken lines $a$—$a$ and $b$—$b$ are shown dividing the sections of the laminations into three parts which will be recognized as the outer marginal portion, the mid portion and the inner marginal portion, the said laminations being characterized in their cross-section, although not necessarily so, by the mid portion being materially thicker than the marginal portions and the marginal portions tapered toward the ends of the section.

It will be seen that the laminations are "dished" in alternately opposite directions, that is, the major axis of the section of each lamination is tilted relative to the general plane of the ring, the axes of adjacent laminations being tilted to converge in pairs, as will be obvious.

Ordinarily, such opposed dishing of the laminations will result in purely sharp-line contact between adjacent laminations at their inner or outer edges, as the case may be, and upon flexion or movement of the rings upwardly or downwardly as the piston reciprocates considerable friction, wear, and even noise may be the result. In the present instance, such edge contact is avoided and the line of contact moved materially inwardly of the inner or outer edge of the laminations, as the case may be, by reason of the contacting surfaces of the marginal portions being slightly arcuate as from the line $a$—$a$ to the outer edges of the laminations $3^a$, $3^b$, and $3^c$, $3^d$ and from the line $b$—$b$ to the inner edges of the laminations $3^b$, $3^c$ in the particular example shown. Similar contact between the inner marginal portions of the laminations $3^a$ and $3^d$ with the upper and lower walls of the piston groove is also obtained. I preferably make the curvature of this contacting arc of a considerably greater radius than the general curvature of the upper and lower surfaces of the laminations resulting in their centrally thickened construction as the relative movement between the laminations is slight and as nearly a true rolling motion between such laminations is desired. Further, by maintaining a slightly arcuate condition, a virtually considerable area of rolling contact may be maintained between the laminations with the minimizing of wear and without excessive friction.

The use of a thickened mid section in the laminations not only adds extra strength thereto at the center, but in rolling the ring from a strip having such section, the actual bending takes place about the medial line of the metal instead of about the inner edge of the ring, as is the case with the purely flat section, and this is found to give a ring lamination having a strengthened resiliency eminently adapted to fulfill functions called for in a piston ring of this type. The rolling contact of the laminations also reduces the relative leverage between the laminations and thereby eliminates untoward spring action therebetween which might otherwise result in metallic noise or knock when the ring is in use.

The cooperative but free action of the laminations permits them to meet the varying conditions of cylinder wall surface encountered during the reciprocating movement of the piston in actual service.

This invention may be developed within the scope of the following claims without departing from the essential features of the said invention, and that it is desired that the specification and drawing be read as being merely illustrative, and not in a limiting sense, except as necessitated by the prior art.

What I claim is:

1. In a laminated piston ring, a plurality of laminations arranged one above the other, said laminations being dished in alternately opposite directions, whereby said laminations alternately approach each other at their inner and outer edges, said laminations being thicker in their medial portions than in their marginal portions and tapered from their medial portions to the edges of said laminations.

2. In a laminated piston ring, a plurality of laminations arranged one above the other, said laminations being dished in alternately opposite directions, whereby said laminations alternately approach each other at their inner and outer edges, said laminations being thicker in their medial portions than in their marginal portions and tapered from their medial portions to the edges of said laminations, the meeting faces of said laminations being shaped to provide a line of contact therebetween inwardly of the edges thereof.

3. In a laminated piston ring, a plurality of laminations arranged one above the other, said laminations being dished in alternately opposite directions, whereby said laminations alternately approach each other at their inner and outer edges, said laminations being thicker in their medial portions than in their marginal portions and tapered from their medial portions to the edges of said laminations, the meeting faces of said laminations being arcuate to provide a rolling contact therebetween inwardly of the edges thereof.

4. In a laminated piston ring, a plurality of laminations arranged one above the other, said laminations being dished in alternately opposite directions, whereby said laminations alternately approach each other at their inner and outer edges, the upper and lower surfaces of said laminations being of arcuate form, whereby said laminations taper from the central portion thereof to the edges thereof.

5. In a laminated piston ring, a plurality of laminations arranged one above the other, said laminations being dished in alternately opposite directions, whereby said laminations alternately approach each other at their inner and outer edges, the upper and lower surfaces of said laminations being of arcuate form, whereby said laminations taper from the central portion thereof to the edges thereof, the meeting margins of said laminations having a curvature of greater radius in the central portions thereof and affording a rolling contact between said marginal portions.

6. In a laminated piston ring, a plurality of laminations arranged one above the other, said laminations being dished in alternately opposite directions, whereby said laminations alternately approach each other at their inner and outer edges, the upper and lower surfaces of said laminations being of arcuate form, whereby said laminations taper from the central portion thereof to the edges thereof, the meeting margins of said laminations having a curvature of greater radius in the central portions thereof and affording a rolling contact between said marginal portions inwardly of the edges thereof.

JAMES J. CARROLL.